P. ROERIG.
TONGUE TRUCK.
APPLICATION FILED SEPT. 19, 1913.

1,108,790.

Patented Aug. 25, 1914.

Inventor,
Peter Roerig.
By Victor J. Evans,
Attorney.

Witnesses:
Christ Feinle, Jr.
K. Peawh

UNITED STATES PATENT OFFICE.

PETER ROERIG, OF KRANZBURG, SOUTH DAKOTA.

TONGUE-TRUCK.

1,108,790.

Specification of Letters Patent. Patented Aug. 25, 1914.

Application filed September 19, 1913. Serial No. 790,750.

*To all whom it may concern:*

Be it known that I, PETER ROERIG, a citizen of the United States, residing at Kranzburg, in the county of Codington and State of South Dakota, have invented new and useful Improvements in Tongue-Trucks, of which the following is a specification.

This invention has relation to tongue trucks especially adapted to be used upon harvesters or binders and it includes the novel features hereinafter described and claimed.

An object of the invention is to provide a support for the stub tongue of a harvester or binder, the said support being adapted to turn as the tongue is swung in order that the binder or harvester may effect a short turn.

With the above object in view the structure includes a shaft which is journaled to the stub tongue of a harvester or binder and which carries at its lower end a journaled wheel which is approximately frusto-conical and which is provided at its larger diameter with a peripheral flange. This wheel is pitched at an acute angle to a horizontal or the surface of the ground. An arm is fixed to the shaft and a bell crank lever is pivoted to the stub tongue. A draft tongue is pivotally connected with the forward end of the bell crank lever and a rod connects the other end of the bell crank lever with the said arm. The draft tongue is arranged to swing vertically with relation to the bell crank lever and the bell crank lever and draft tongue may swing horizontally or transversely with relation to the stub tongue.

Figure 1:
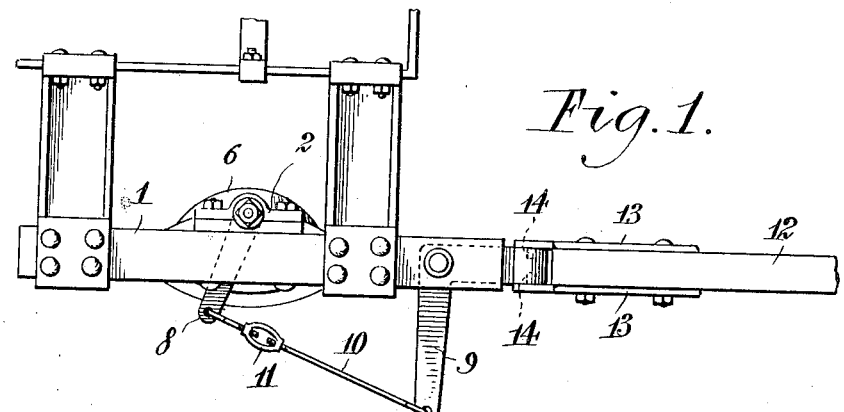
Figure 2:
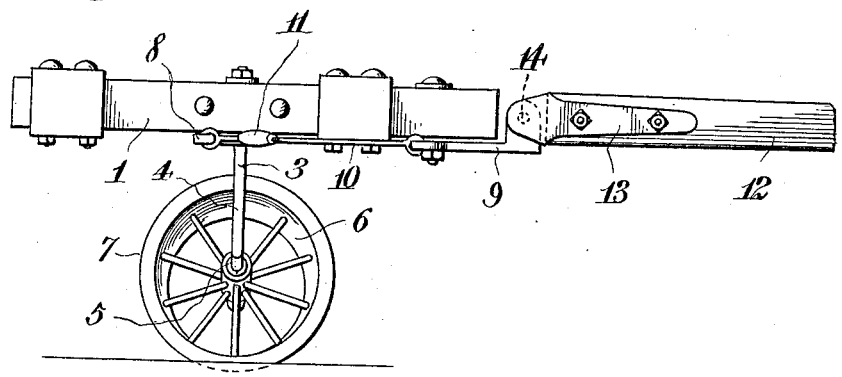
Figure 3:
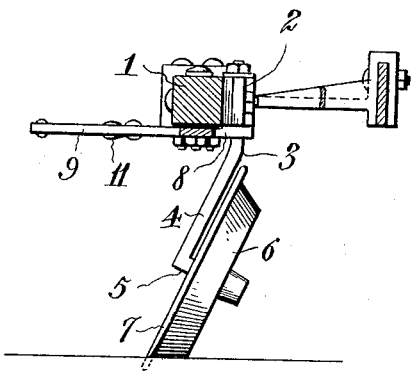

In the accompanying drawing: Figure 1 is a plan view of the tongue truck. Fig. 2 is a side elevation of the same. Fig. 3 is a transverse sectional view of the same.

As shown in the drawings the stub tongue 1 is connected with the frame of the harvester or binder in any desired manner. The stub tongue 1 is fixed with relation to the frame of the machine. A bearing 2 is provided at the side of the stub tongue 1 and a shaft 3 is journaled in said bearing. The upper portion of the shaft 3 is vertically disposed and the intermediate portion 4 thereof is disposed at an acute angle with relation to a horizontal or the surface of the ground. The shaft 3 is provided at its lower end with a spindle portion 5 upon which is journaled a ground wheel 6. The spindle portion 5 is disposed at a right angle to the intermediate portion 4 of the shaft 3. The wheel 6 is frusto-conical and is provided at its greater diameter with a peripheral flange 7. The wheel 6 is disposed at an acute angle with relation to a horizontal or the surface of the ground but the lower portion of the periphery of the wheel rests flat upon the surface of the soil. An arm 8 is fixed to the upper portion of the shaft 3 immediately below the stub tongue 1. A bell crank lever 9 is fulcrumed under the forward portion of the stub tongue 1 and a rod 10 connects one end of the bell crank lever 9 with the end of the arm 8. The rod 10 is composed of sections which are adjustably connected together by means of a turn buckle 11 so that the rod 10 is longitudinally extensible. A draft tongue 12 is provided at the side of its rear end portion with irons 13 having inwardly disposed gudgeons 14 which are loosely received in the forward end of the bell crank lever 9. The draft tongue 12 may swing vertically with relation to the stub tongue 1 and the bell crank lever 9 and the said draft tongue 12 may swing horizontally with relation to the stub tongue 1.

When the draft tongue 12 and the bell crank lever 9 are swung horizontally the rod 10 is moved longitudinally whereby the arm 8 is swung about the axis of the shaft 3. This shaft 3 is turned in the bearing 2 and the supporting wheel 6 is turned upon the surface of the ground so that the said supporting wheel is disposed approximately in the same direction as the draft tongue 12. Inasmuch as the supporting wheel 6 is under the stub tongue 1 and the flange 7 thereof encounters the ground the turning of the wheel 6 as above described will effect a short turn on the part of the binder or harvester. Therefore it will be seen that a tongue truck of simple structure is provided and that the parts of the truck are readily operated by the movement of the draft tongue to effect a short turning of the machine to which the stub tongue is attached.

Having described the invention what is claimed is:—

In combination with a stub tongue a tongue truck comprising a bearing mounted at one side of the stub tongue, a shaft journaled in the bearing and having an intermediate angularly disposed portion located under the intermediate portion of the stub tongue, a wheel journaled at the lower end of the shaft and disposed under the intermediate portion of the stub tongue, an arm fixed to the upper portion of said shaft and disposed transversely under the intermediate portion of the stub tongue, a bell crank lever fulcrumed to the forward portion of the stub tongue at a point between the sides thereof, means connecting one end of the bell crank lever with the arm and a draft tongue pivotally connected with the bell crank lever.

In testimony whereof I affix my signature in presence of two witnesses.

PETER ROERIG.

Witnesses:
J. P. ANTONY,
CONRAD L. JOHNSON.

Copies of this patent may be obtained for five cents each, by addressing the "Commissioner of Patents, Washington, D. C."